(12) United States Patent
Rainczuk et al.

(10) Patent No.: US 7,394,384 B2
(45) Date of Patent: Jul. 1, 2008

(54) PERSONAL LOCATOR BEACON

(75) Inventors: Joseph Peter Rainczuk, Sassafras (AU); Tilo Schmidt, Healesville (AU)

(73) Assignee: Tracme Beacons Pty Ltd (AU)

( * ) Notice: Subject to any disclaimer, the term of this patent is extended or adjusted under 35 U.S.C. 154(b) by 226 days.

(21) Appl. No.: 10/595,870

(22) PCT Filed: Nov. 19, 2004

(86) PCT No.: PCT/AU2004/001614

§ 371 (c)(1),
(2), (4) Date: May 17, 2006

(87) PCT Pub. No.: WO2005/050244

PCT Pub. Date: Jun. 2, 2005

(65) Prior Publication Data

US 2007/0090959 A1      Apr. 26, 2007

(30) Foreign Application Priority Data

Nov. 19, 2003     (AU) .............................. 2003906385

(51) Int. Cl.
*G08B 23/00*        (2006.01)
(52) U.S. Cl. ................ 340/573.1; 340/574; 340/539.11; 340/540

(58) Field of Classification Search ................. 340/574, 340/573.1, 539.11, 540, 539.1, 539.13, 539.21, 340/539.23, 573.3, 568.1, 686.1, 691.7; 342/357.09, 342/386
See application file for complete search history.

(56) References Cited

U.S. PATENT DOCUMENTS

| 5,006,831 | A | * | 4/1991 | de Solminihac .......... 340/573.1 |
| 5,218,366 | A |   | 6/1993 | Cardamone et al. |
| 5,710,989 | A | * | 1/1998 | Flood ......................... 455/100 |
| 6,195,039 | B1 |   | 2/2001 | Glass, Jr. |
| 6,275,164 | B1 |   | 8/2001 | MacConnell et al. |
| 6,552,652 | B2 | * | 4/2003 | Beken ..................... 340/407.1 |
| 6,756,901 | B2 | * | 6/2004 | Campman ................ 340/573.1 |
| 6,946,960 | B2 | * | 9/2005 | Sisson et al. ................ 340/540 |

FOREIGN PATENT DOCUMENTS

GB            2050956 A        1/1981

* cited by examiner

*Primary Examiner*—Anh V. La
(74) *Attorney, Agent, or Firm*—Brooks Kushman P.C.

(57) ABSTRACT

A personal locator beacon including: an outer case open at one end and an inner case having a major portion removably received within the outer case leaving a minor portion extending outside the outer case; a wireless transmitter and a power supply within the inner case; and a switch for automatically connecting the power supply to the wireless transmitter to thereby activate the wireless transmitter to transmit a signal when the major portion of the inner case is removed from the outer case.

21 Claims, 8 Drawing Sheets

PERSONAL LOCATOR BEACON

FIELD OF THE INVENTION

This invention relates to beacons for alerting and assistance in the location of persons lost or in distress. In particular it relates to an electronic radio-frequency locator beacon suitable for personal use.

BACKGROUND OF THE INVENTION

Emergency location devices, such as emergency position indicating radio beacons ("EPIRBs") and emergency personal locators ("EPLs"), are used in search and rescue to locate people. When activated, such devices usually transmit a code or similar signal on a standard international search and rescue radio frequency for homing radio direction finding.

An inherent shortcoming of existing emergency location devices is the high transmit power needed to operate the integral transmitter. For these transmitters to be powered for reliable use, the associated battery must be capable of operation over an extended period. Since these devices must be capable of relatively high-power transmission, the batteries needed to power the devices are necessarily large; thus the overall device generally is large and therefore cumbersome. In addition, the devices require sufficient operating life to ensure the location of a user in distress.

A need therefore exists for a rugged, small, light weight, reliable, low power emergency-alerting device capable of transmitting a radio frequency signal.

SUMMARY OF THE INVENTION

According to the present invention, there is provided a personal locator beacon including:
- an outer case open at one end and an inner case having a major portion removably received within the outer case leaving a minor portion extending outside the outer case;
- a wireless transmitter and a power supply within the inner case; and
- a switch for automatically connecting the power supply to the wireless transmitter to thereby activate the wireless transmitter to transmit a signal when the major portion of the inner case is removed from the outer case.

Preferably, the switch is not operable to disconnect the power supply from the wireless transmitter after the major portion of the inner case has been removed from the outer case whereby the beacon is a single-use beacon.

The switch is preferably a sliding switch slidably mounted within the inner case in an open position when the major portion of the inner case is disposed within the inner case, the sliding switch engaging one end of an activation pin slidably mounted in the inner case and the other end of the activation pin projecting exteriorly of the inner case in a gap provided between facing surfaces of the major portion of the inner case and the outer case, wherein the projecting end of the activation pin is depressed into the inner case by a ramp on an inner surface of the outer case during removal of the major portion of the inner case from the outer case so that the activation pin moves the sliding switch to a closed position whereby the wireless transmitter is activated.

Preferably, the sliding switch freely engages with and releases from the activation pin so that the sliding switch cannot be returned to the open position by withdrawing the activation pin from the inner case.

Preferably, the inner case and the outer case are releasably locked together via a locking pin when the major portion of the inner case is disposed within the outer case, the locking pin extending through a hole formed in the closed end of the outer case, one end of the locking pin releasably locking the inner case and the outer case together and the other end of the locking pin being provided with a pull ring disposed exteriorly of the outer case, wherein pulling the pull ring away from the closed end of the outer case unlocks the inner case from the outer case so that the major portion of the inner case can be removed from the outer case whereby the wireless transmitter is activated.

In use, the personal locator beacon is preferably attached to a user via the pull ring such that the radio transmitter can be activated by the user pulling the minor portion of the inner case with one hand away from the attached pull ring.

The wireless transmitter is preferably a radio transmitter and the transmitted signal is a radio signal. Preferably, the personal locator beacon further includes a radio receiver.

The power supply is preferably a single-use battery.

It is further preferred that the radio-frequency signal that is transmitted is a voice transmission, particularly in the Ultra High Frequency (UHF) Citizens Band (CB), Family Radio Service (FRS) or similar transmission band. The preferred voice transmission is the repetition of the word "mayday" or other similar indication of distress as is permitted by the relevant local regulations.

The inner case may include a microprocessor and a programmable voice memory unit that is able to provide a variety of voice messages. In addition to the voice message, the transmission may include a digital code such as a specific identifier for the beacon or the GPS co-ordinates as indicated by the integral GPS receiver if this feature is implemented.

It is further preferred that the outer case includes a clip that is adapted to attach the beacon to a user's person such as by attachment-to clothing, belt or harness.

The inner case may be attached to the outer case by means of a flexible attachment, such as a thread. By this means the inner case, once the beacon is activated, can remain attached to the person via the outer case and clip. The flexible attachment may be frangible so that the inner case can be detached if desired in suitable circumstances.

Whilst the beacon may have an internal antenna within the inner case, it is preferred that the antenna is a flexible external wire antenna attached to the inner case which deploys when the unit is activated. Preferably, the inner case is adapted to float with a lower portion below a waterline when the beacon is deployed on water, and on deployment the antenna springs upwardly away from the lower portion of the inner case to a generally upright extended position above the waterline.

BRIEF DESCRIPTION OF THE DRAWINGS

An embodiment of the present invention will now be described solely by way of non-limiting example and with reference to the accompanying drawings in which.

DETAILED DESCRIPTION OF THE EMBODIMENT

Figure 1:
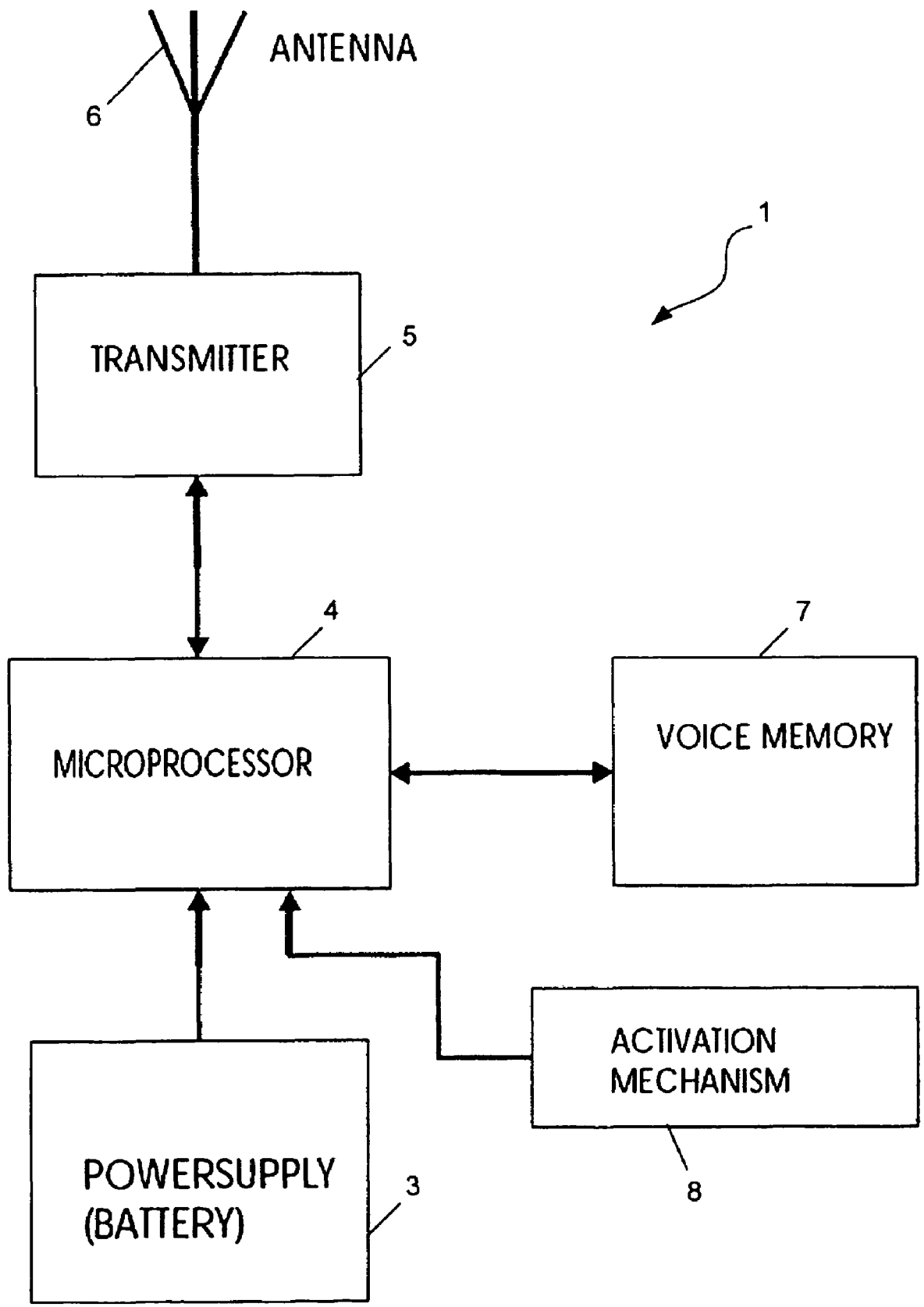
FIG. 1 is a block diagram of an embodiment of a personal locator beacon of the present invention.
Figure 2:
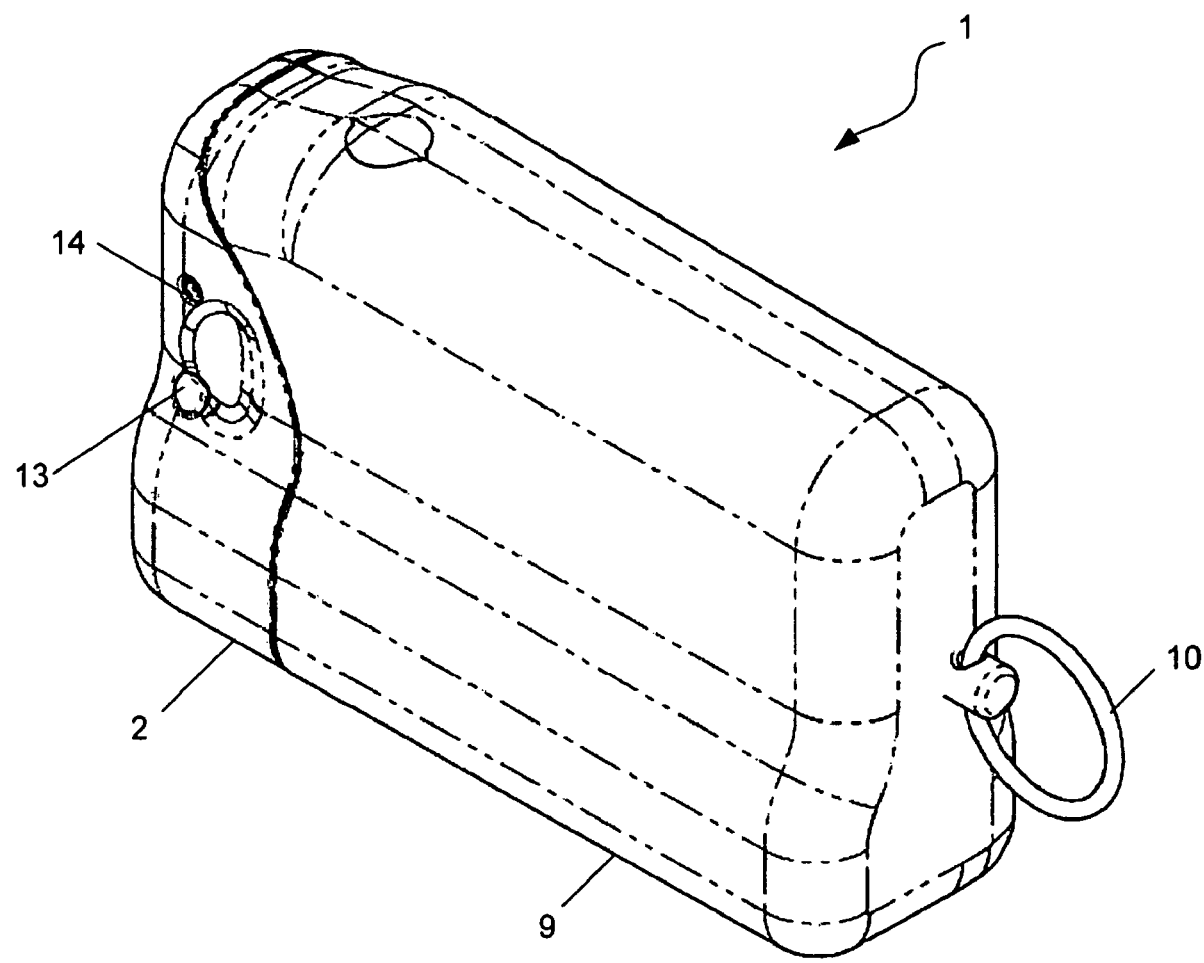
FIG. 2 is a perspective view of the beacon of FIG. 1 shown in its unactivated state.
Figure 3:
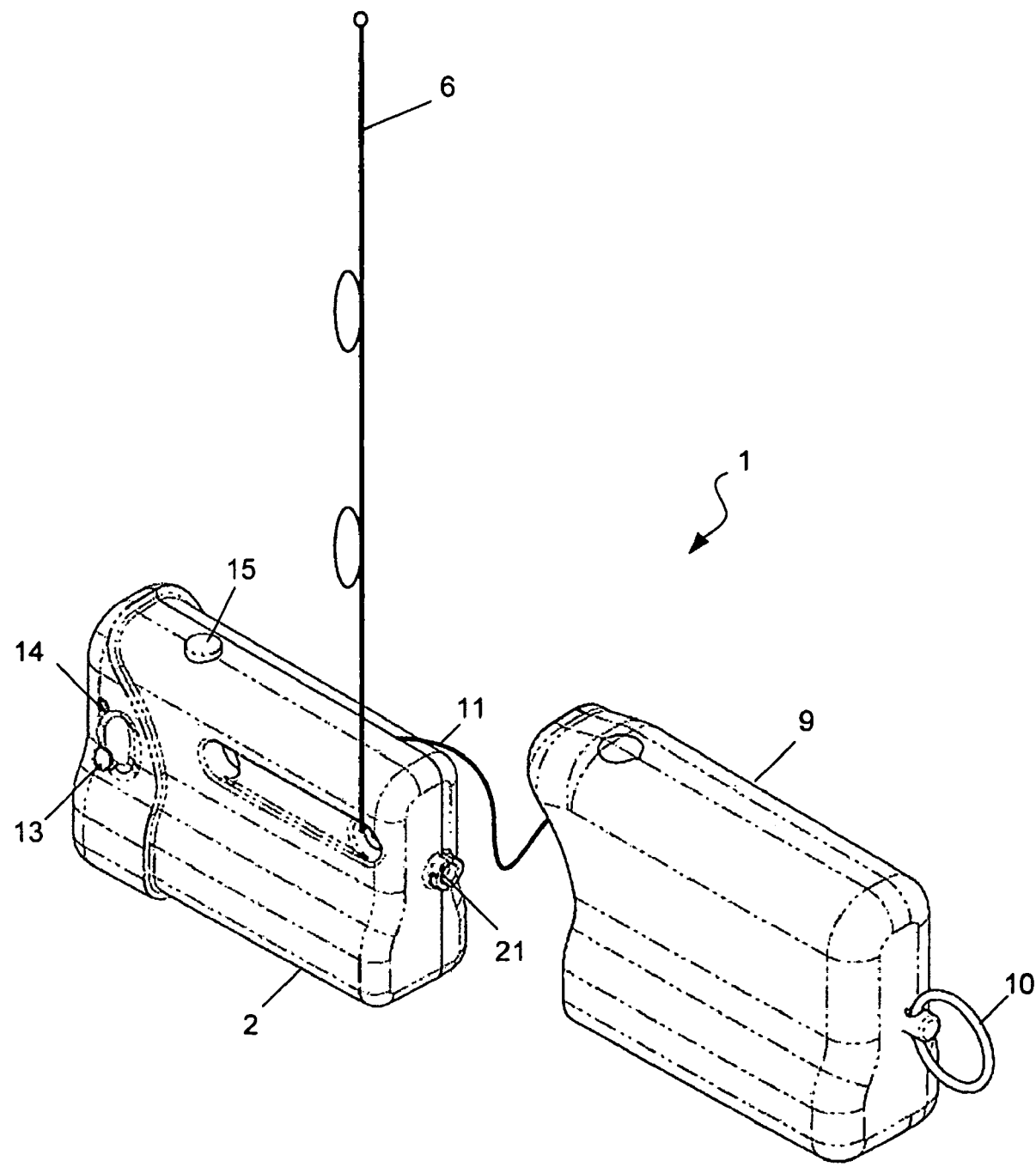
FIG. 3 is a perspective view of the beacon in its activated state.

A personal locator beacon 1 according to the invention is generally illustrated in FIGS. 1 to 3.

An inner case 2, of injection moulded plastic, contains a battery power supply 3, a microprocessor 4 a radio-frequency signal transmitter 5 and an antenna 6. Included with the microprocessor within the inner case 2 is a programmable voice memory unit 7 and an activation mechanism 8. This arrangement is shown schematically in FIG. 1. An outer case 9 acts as a holder for the inner case 2 and includes a ring 10 by which the beacon 1 can be attached conveniently to a user. As best seen in FIGS. 2 and 3, the outer case 9 is open at one end and the inner case 2 has a major portion removably received within the outer case 9 leaving a minor portion extending outside the outer case 9. When the inner case 2 is removed from the outer case 9 (such as by the user gripping it with two fingers and pulling it down and outwards) the activation mechanism 8 is tripped and the beacon will begin to transmit its pre-programmed signal. This arrangement allows single-handed operation of the beacon 1.

As best seen in FIG. 3, the antenna 6 is an external whip antenna on the major portion of the inner case 2 that is biased compressed when the major portion of the inner case 2 is disposed within the outer case 9. The antenna 6 automatically springs to deploy when the major portion of the inner case 2 is removed from the outer case 9. The inner case 2 is adapted to float with a lower portion below a waterline when the beacon is deployed on water, and on deployment the antenna 6 springs upwardly away from the lower portion of the inner case 2 to a generally upright extended position above the waterline.

Figure 4A:
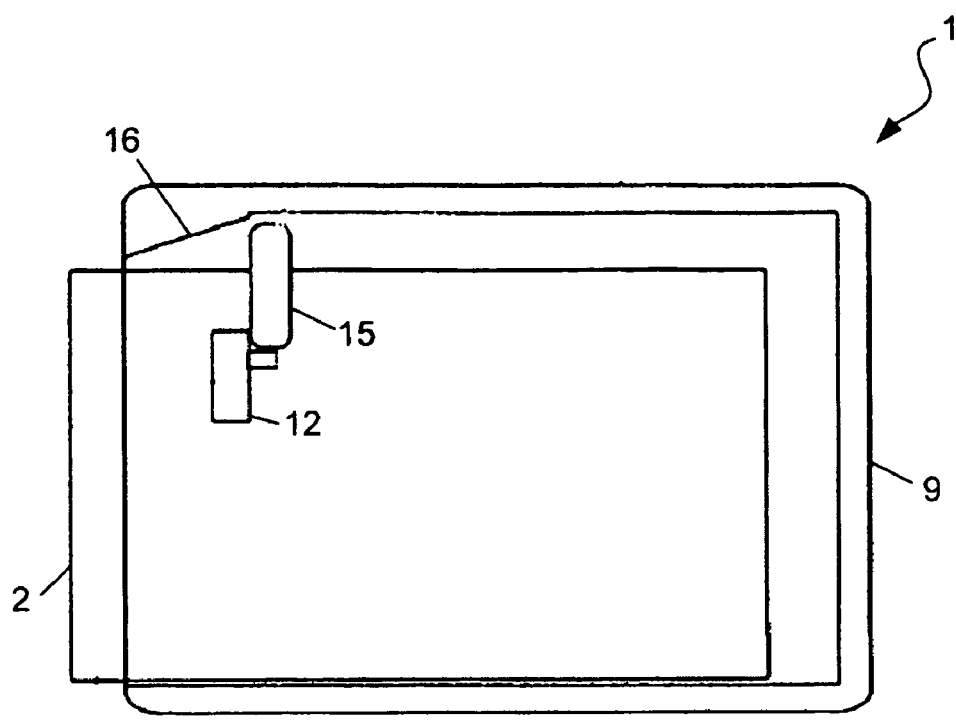
FIGS. 4A and 4B are cutaway side views illustrating the activation sequence of the beacon.
Figure 4B:
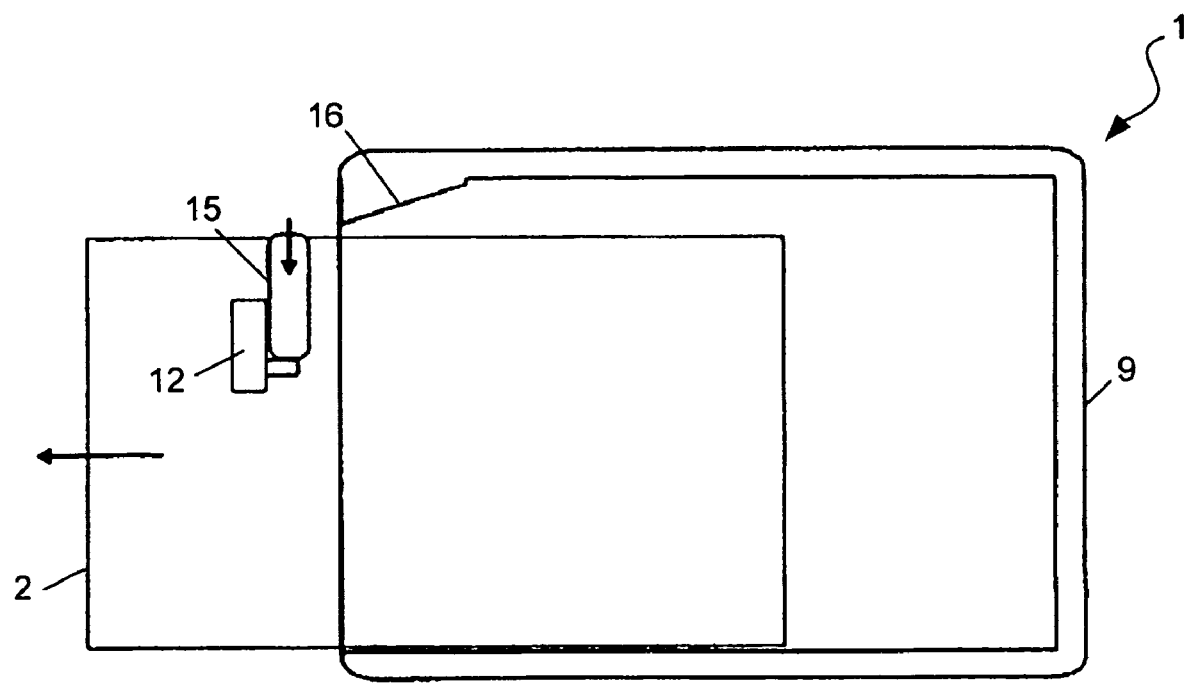

FIGS. 4A and 4B illustrate the activation sequence of the beacon 1. Referring to FIG. 4A, the inner case 2 includes an internal sliding switch 12 which is initially set in the open position. An activation pin 15 is slidably mounted in the inner case 2 with one end freely engaging the sliding switch 12, and the other end projecting exteriorly of the inner case 2 in a gap provided between facing surfaces of the major portion of the inner case 2 and the outer case 9. A ramp 16 is provided on the inner surface of outer case 9 to depress the activation pin 15 into the inner case 2 during removal of the major portion of the inner case 2 from the outer case 9. When the inner case 2 is removed from the outer case 9 to activate the beacon 1, the activation pin 15 pushes the sliding switch 12 into the closed position thereby powering up the beacon 1, as illustrated in FIG. 4B. The activation pin 15 is not mechanically fixed to the sliding switch 12, and therefore, removing the activation pin 15 will not return the sliding switch 12 to the off position to deactivate the beacon 1. Thus, the activation of the beacon 1 cannot be reversed—that is, returning the inner case 2 into the outer case 9 will not deactivate the beacon 1. This ensures that the beacon 1 is a "one use only" system. After the beacon 1 has been activated once, it cannot be used again, and needs to be discarded and replaced with a new unit. A sticker (not shown) covering the join between inner and outer cases 2, 9 indicates if the beacon 1 has been tampered with. For example, the sticker may indicate "do not use if seal is broken".

Figure 5:
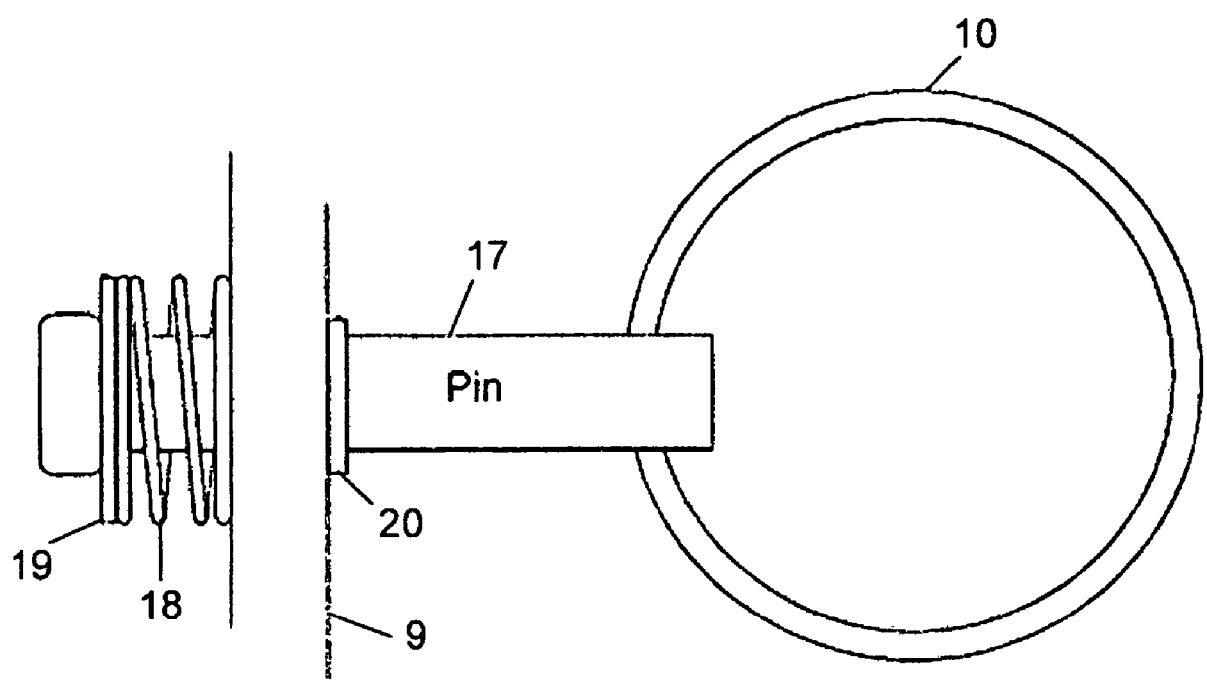
FIG. 5 is a side view of a locking pin used in the beacon.
Figure 6A:
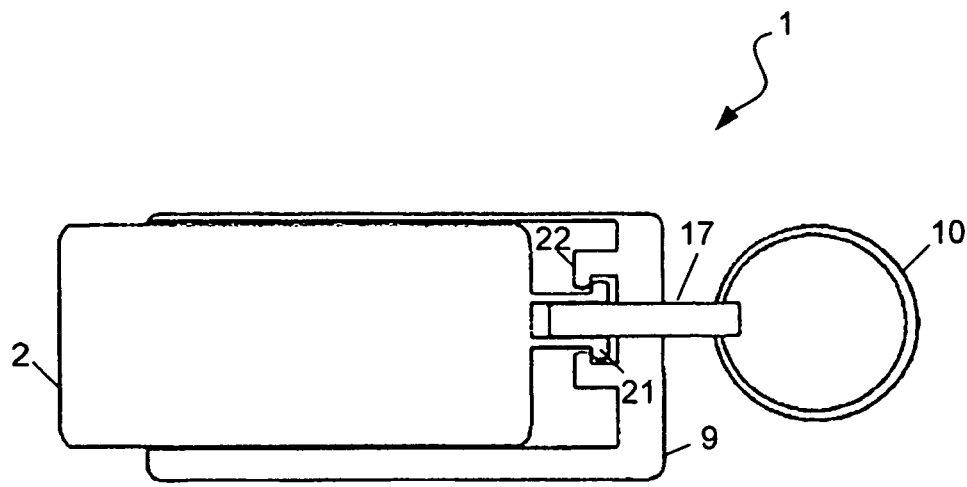
FIGS. 6A to 6C are cutaway side views illustrating the unlocking sequence of the beacon.
Figure 6B:
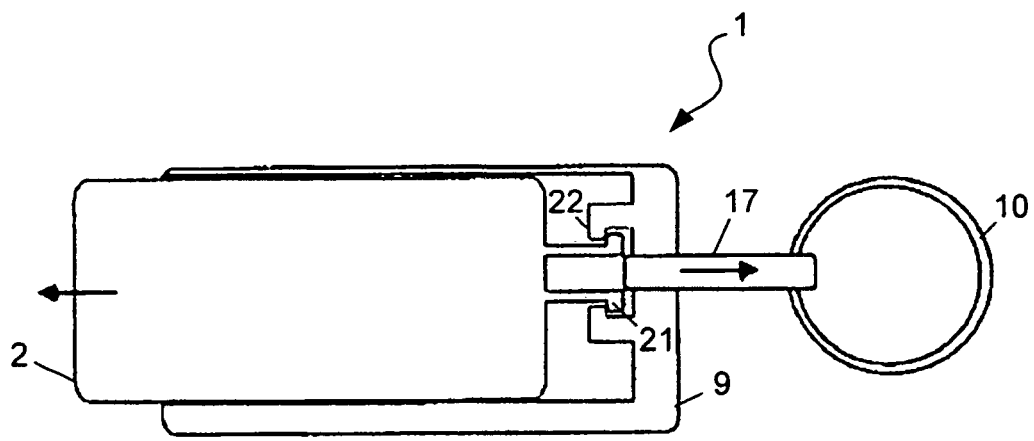
Figure 6C:
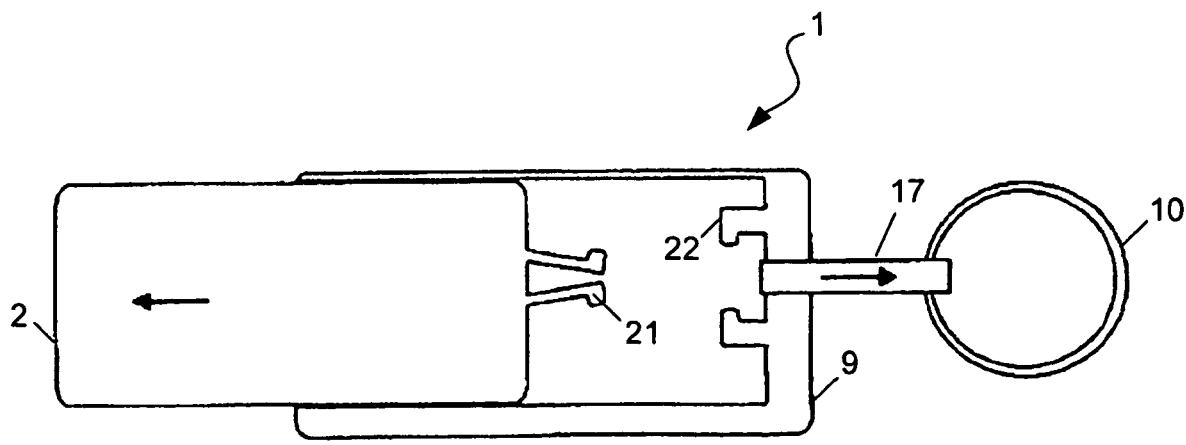

Referring to FIG. 5 and FIGS. 6A to 6C, the inner case 2 and the outer case 9 are releasably locked together via a locking pin 17 when the major portion of the inner case 2 is disposed within the outer case 9. The locking pin 17 extends through a hole (not shown) formed in the closed end of the outer case 9. As best seen in FIG. 5, the locking pin 17 is provided with a pull ring 10 disposed exteriorly of the outer case 9. The locking pin 17 is spring-loaded in the outer case 9 by a spring 18 and a washer 19 on the inner surface of the outer case 9, and a retaining clip 20 on the outer surface of the outer case 9. As best seen in FIGS. 6A to 6C (the spring 18 is omitted for clarity), the inner case 2 has a spigot 21 with an external bead. The outer case 9 has a mating spigot 22 with an internal groove, in which the bead from the inner case 2 sits to thereby lock the inner case 2 and the outer case 9 together, as seen in FIG. 6A. When the spring-loaded locking pin 17 is at rest, it locks the inner and outer cases 2, 9 together thereby preventing the removal of the inner case 2. Referring to FIGS. 6B and 6C, when the locking pin 17 is pulled up against the spring pressure by pulling the pull ring 10 away from the closed end of the outer case 9, the mechanism is able to release and the inner case 2 can be removed from the outer case 9 thereby activating the beacon 1. This arrangement minimises accidental or inadvertent activation of the beacon 1. In particular, the inner case 2 is releasably locked into the outer case 9 by the locking pin 17 with the ring 10 used to attach the beacon 1 to a user via a clip or strap (not shown). The locking pin 17 is spring-loaded, and needs to be pulled out approximately 2 mm before the inner case 2 can be withdrawn from the outer case 9. That is, holding the outer case 9 will not allow removal of the inner case 2. Instead, it is necessary to hold the locking pin 17 via the ring 10 and pull on the minor portion of the case 2. This will first cause the locking pin 17 to pull out from the spigot 21, thereby releasing the inner case 2. In general, this means that the beacon 1 can be activated with one hand when it is attached to clothing or a bag via the ring 10.

As best seen in FIG. 3, a thread 11 attaches the inner case 2 to the outer case 9 so that the entire unit remains attached to the user by the ring 10. This arrangement is desirable in certain uses, such as in climbing, so that the inner case does not drop away from the user. However, the thread 11 is frangible so that it can be broken, such as with a firm pull by the user, to separate the inner case 2. This might be desirable if the beacon 1 is to be set up in an open position while the user seeks shelter nearby. Optionally, the thread 11 may be a length of reflective ribbon to aid in visually locating the beacon 1.

The radio transmitter 5 is tuned to operate on a designated public emergency channel in the UHF CB, FRS or similar frequency band and the voice memory unit 7 is programmed to transmit the message "mayday" or other similar indication of distress as is permitted by the relevant local regulations, approximately every 15 seconds. For those reasons, there is no special receiving equipment required to detect and understand the beacon's transmission. A commonly used CB radio receiver or transceiver is all that is required. It will be appreciated, however, that a directional antenna would be advantageous in homing into and locating the beacon 1.

If required, the voice memory unit 7 can be programmed to generate a more specific voice message, such as "man overboard". In addition to the voice message, a digital code could be generated; for example as a specific code to identify the particular beacon or the GPS co-ordinates as indicated by the integral GPS receiver if this feature is implemented.

The battery power supply 3 is of a standard long-life, lightweight type, and is adapted to power the activated transmitter for approximately 160 hours of continuous use. The battery has a shelf life of at least 10 years. In keeping with the single-use nature of the beacon 1, the battery 3 is a single-use battery.

Figure 7:
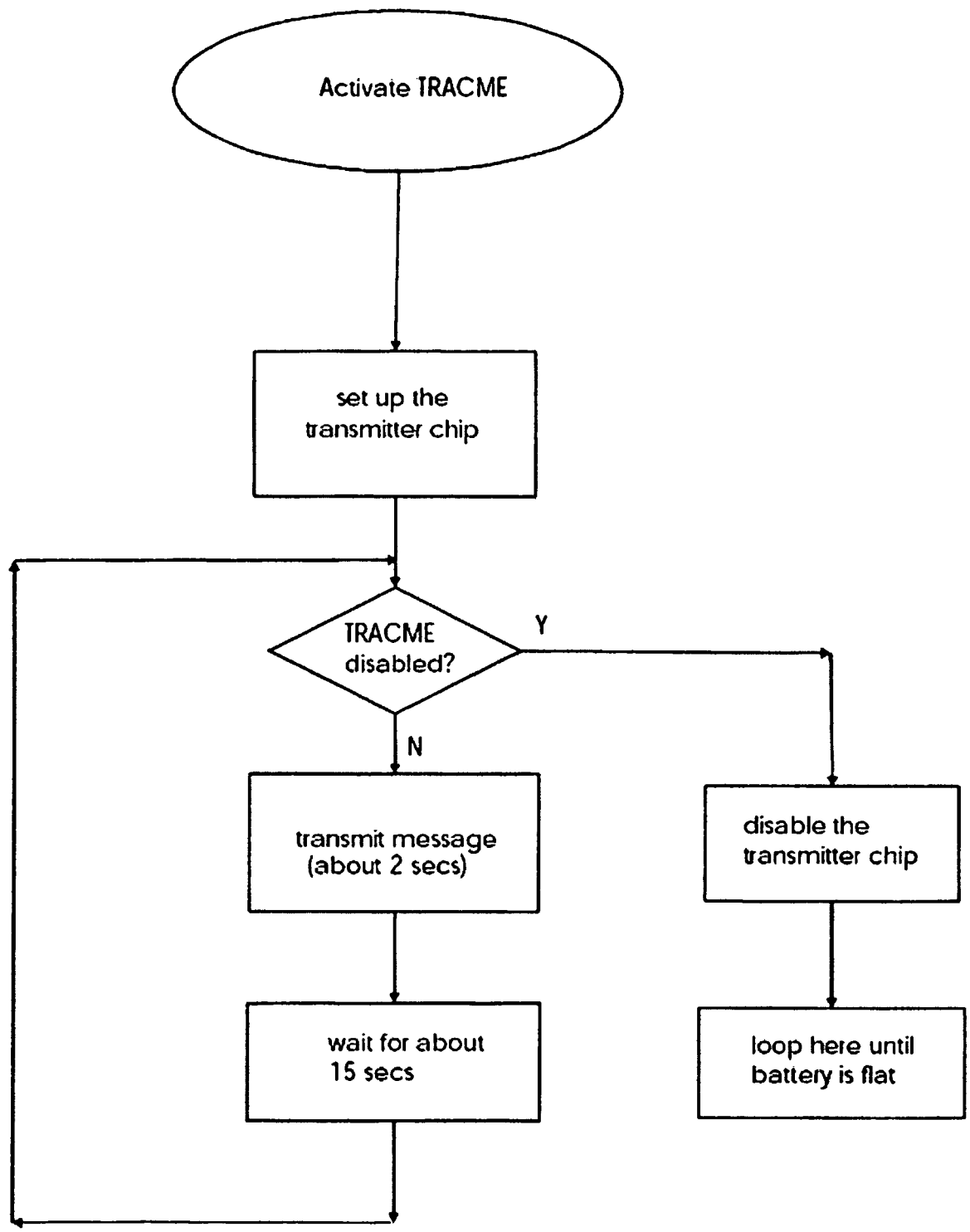
FIG. 7 is a flow chart showing the electronic operation of the beacon when activated.

The electronic operation of the beacon when activated is shown schematically in the flow chart of FIG. 7.

With such a structure and composition as described above, the beacon has a weight of approximately 35 to 50 grams and dimensions of approximately 2.5 cm×4.5 cm×7 cm. The beacon is therefore highly portable and has a volume of less than around 150 cm$^3$, and preferably around 75 cm$^3$, when the major portion of the inner case 2 is disposed within the outer case 9. As such, the device is adapted to be conveniently and readily worn attached to the body of a user; such as attached to a belt or buttonhole by the ring 10 on the outer case 9.

Generally, existing beacons can be used and re-used at any time, thus there can be no assurance of the duration of operation of the beacon, once activated. Conversely, the embodiment of the beacon of the present invention, being a single-use device, discourages a user from "trying it out". This ensures that for the entire life of the unit, the battery is fully charged ready for the time when the beacon is required in an emergency. The single-use nature of the beacon also reduces the required maintenance of the unit to zero.

Figure 8:
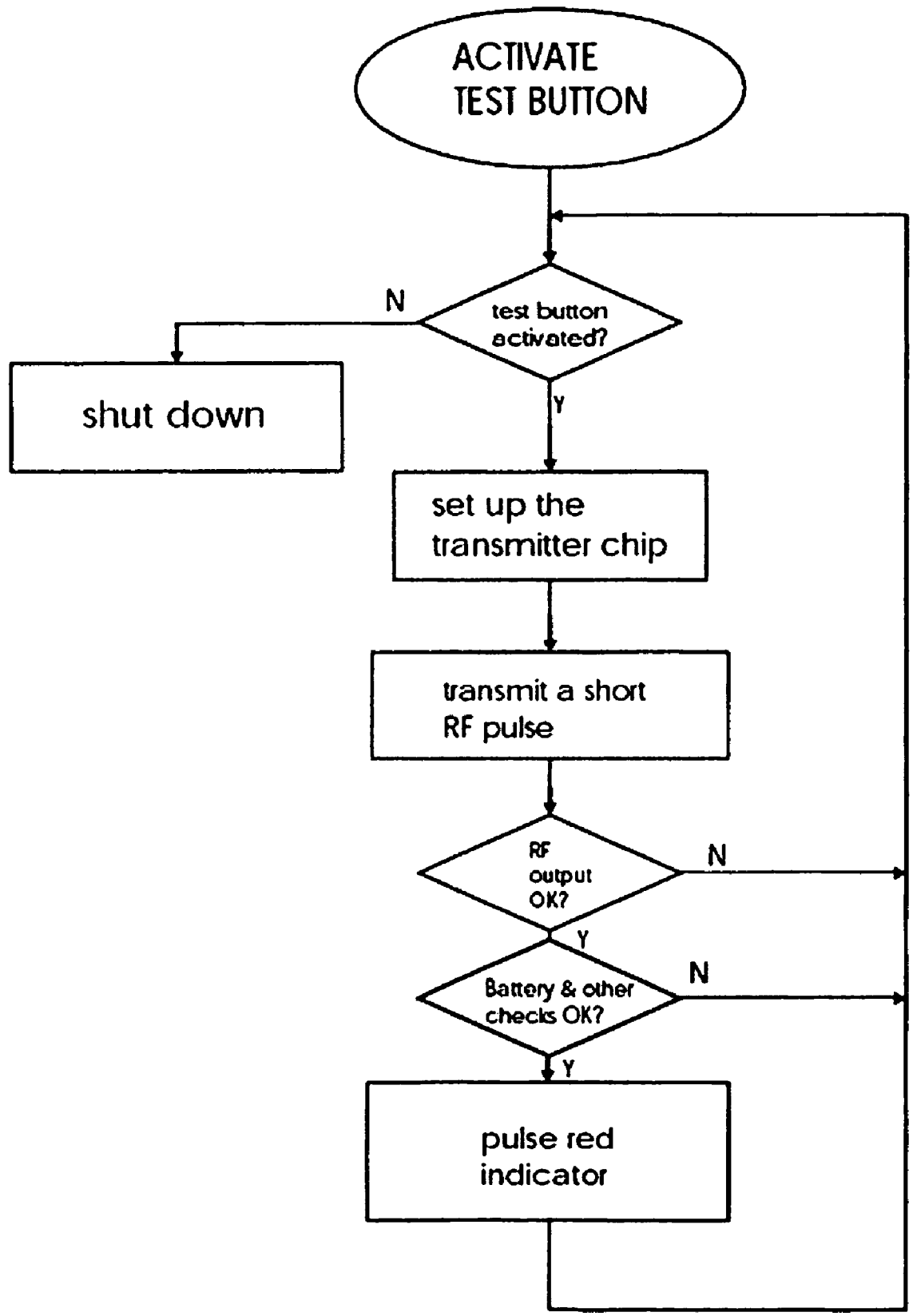
FIG. 8 is a flow chart showing the electronic operation of a test button of the beacon.

As best seen in FIGS. 2 and 3, the inner case 2 of the beacon can be fitted with a simple test button 14 to send a single pulse to a visual indicator 13. When the test button 14 is depressed, the test sequence illustrated in the flow chart of FIG. 8 is implemented. However, because there are no activating buttons or controls on the outer surface of the outer case 9, the possibility of false activations is reduced. Once the beacon 1 is activated, it can be deactivated by pressing the test button 14 for longer than 10 seconds.

It will be appreciated that the embodiments described above are intended only to serve as examples, and that many other embodiments are possible with the spirit and the scope of the present invention.

For example, embodiments of the personal locator beacon of the present invention may include a speaker or audible alarm transducer. Embodiments may also incorporate a radio receiver to facilitate two-way communication with rescuers or allow rescuers to retrieve specific information from the unit. A display panel such as an LCD may also be included in embodiments of the present invention. In certain embodiments, one or both of the inner case and the outer case include integral flotation so that the beacon may float in water.

The invention claimed is:

1. A single-use personal locator beacon including:
   an outer case open at one end and an inner case having a major portion removably received within the outer case leaving a minor portion extending outside the outer case;
   a wireless transmitter and a power supply within the inner case; and
   a one-way switch for automatically connecting the power supply to the wireless transmitter to thereby activate the wireless transmitter to transmit a signal when the major portion of the inner case is removed from the outer case, wherein the switch is not operable to disconnect the power supply from the wireless transmitter after the major portion of the inner case has been removed from the outer case whereby the beacon is a single-use beacon.

2. A single-use personal locator beacon according to claim 1, wherein the one-way switch is a sliding switch slidably mounted within the inner case in an open position when the major portion of the inner case is disposed within the inner case, the sliding switch engaging one end of an activation pin slidably mounted in the inner case and the other end of the activation pin projecting exteriorly of the inner case in a gap provided between facing surfaces of the major portion of the inner case and the outer case, wherein the projecting end of the activation pin is depressed into the inner case by a ramp on an inner surface of the outer case during removal of the major portion of the inner case from the outer case so that the activation pin moves the sliding switch to a closed position whereby the wireless transmitter is activated.

3. A single-use personal locator beacon according to claim 2, wherein the sliding switch freely engages with and releases from the activation pin so that the sliding switch cannot be returned to the open position by withdrawing the activation pin from the inner case.

4. A single-use personal locator beacon according to claim 3, wherein the inner case and the outer case are releasably locked together via a locking pin when the major portion of the inner case is disposed within the outer case, the locking pin extending through a hole formed in the closed end of the outer case, one end of the locking pin releasably locking the inner case and the outer case together and the other end of the locking pin being provided with a pull ring disposed exteriorly of the outer case, wherein pulling the pull ring away from the closed end of the outer case unlocks the inner case from the outer case so that the major portion of the inner case can be removed from the outer case whereby the wireless transmitter is activated.

5. A single-use personal locator beacon according to claim 4, wherein, in use, the personal locator beacon is attached to a user via the pull ring such that the wireless transmitter can be activated by the user pulling the minor portion of the inner case with one hand away from the attached pull ring.

6. A single-use personal locator beacon according to claim 5, further including an antenna operatively connected to the wireless transmitter.

7. A single-use personal locator beacon according to claim 6, wherein the antenna is an external whip antenna on the major portion of the inner case that is biased compressed when the major portion of the inner case is disposed within the outer case such that the antenna automatically springs to deploy when the major portion of the inner case is removed from the outer case.

8. A single-use personal locator beacon according to claim 7, wherein the inner case is adapted to float with a lower portion below a waterline when the beacon is deployed on water, and wherein on deployment the antenna springs upwardly away from the lower portion of the inner case to a generally upright extended position above the waterline.

9. A single-use personal locator beacon according to claim 8, further including a microprocessor and an associated memory for selectively controlling the wireless transmitter.

10. A single-use personal locator beacon according to claim 9, wherein the memory is programmable to store a selected signal for transmission by the wireless transmitter.

11. A single-use personal locator beacon according to claim 10, wherein the signal transmitted by the wireless transmitter is a voice message.

12. A single-use personal locator beacon according to claim 10, further including a GPS receiver for receiving GPS location data, and wherein the signal transmitted by the wireless transmitter includes GPS location data.

13. A single-use personal locator beacon according to claim 10, wherein the beacon is portable and has a volume of less than around 150 cm3 when the major portion of the inner case is disposed within the outer case.

14. A single-use personal locator beacon according to claim 13, wherein the beacon has a volume of around 75 cm3 when the major portion of the inner case is disposed within the outer case.

15. A single-use personal locator beacon according to claim 14, further including a speaker or an audible alarm transducer.

16. A single-use personal locator beacon according to claim 15, further including a display panel for displaying information associated with the beacon.

17. A single-use personal locator beacon according to claim 15, further including a thread interconnecting the inner case and the outer case when the major portion of the inner case is removed from the outer case, wherein the thread is frangible and/or reflective.

18. A single-use personal beacon according to claim 15, wherein the beacon is adapted to float.

19. A single-use personal locator beacon according to claim 15, wherein the wireless transmitter is a radio transmitter and the signal transmitted by the wireless transmitter is a radio signal.

20. A single-use personal locator beacon according to claim 19, wherein the radio transmitter is a UHF radio transmitter and the radio signal is a UHF radio signal.

21. A single-use personal locator beacon according to claim 19, further including a radio receiver.

* * * * *